United States Patent
Zheng et al.

(10) Patent No.: US 11,444,333 B2
(45) Date of Patent: Sep. 13, 2022

(54) ELECTROCHEMICAL DEVICE

(71) Applicant: NINGDE AMPEREX TECHNOLOGY LIMITED, Ningde (CN)

(72) Inventors: Qiang Zheng, Ningde (CN); Zhanzhao Fang, Ningde (CN); Qi Dang, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 140 days.

(21) Appl. No.: 16/423,389

(22) Filed: May 28, 2019

(65) Prior Publication Data

US 2020/0144674 A1    May 7, 2020

(30) Foreign Application Priority Data

Nov. 5, 2018   (CN) ......................... 201811308831.X (51) Int. Cl.
*H01M 10/0587* (2010.01)
*H01M 10/0525* (2010.01)
(Continued)

(52) U.S. Cl.
CPC ....... *H01M 10/0587* (2013.01); *H01M 4/366* (2013.01); *H01M 4/667* (2013.01); *H01M 4/70* (2013.01); *H01M 10/0525* (2013.01)

(58) Field of Classification Search
CPC ......... H01M 10/0587; H01M 10/0525; H01M 10/0431; H01M 10/045; H01M 10/049;
(Continued)

(56) References Cited

U.S. PATENT DOCUMENTS

| 2009/0092889 A1* | 4/2009 | Hwang | H01M 10/052 429/94 |
| 2010/0136429 A1* | 6/2010 | Muraoka | H01M 10/4235 429/223 |

(Continued)

FOREIGN PATENT DOCUMENTS

| CN | 101958427 A | 1/2011 |
| CN | 202363549 U | 8/2012 |

(Continued)

OTHER PUBLICATIONS

Chinese First Office Action dated Apr. 3, 2020 in counterpart Chinese application 201811308831.X, 6 pages.

*Primary Examiner* — Ula C Ruddock
*Assistant Examiner* — Matthew W Van Oudenaren
(74) *Attorney, Agent, or Firm* — Juan Carlos A. Marquez; Marquez IP Law Office, PLLC (57) ABSTRACT

The present application relates to an electrochemical device. Specifically, the present application provides an electrochemical device, including a cell and a shell enclosing the cell; the cell includes a jelly roll including a first electrode and a second electrode spaced from each other, a separator is disposed between the first electrode and the second electrode, the first electrode and the second electrode are wound to form the cell; the first electrode includes a first current collector, the first current collector includes a first surface and a second surface disposed oppositely; the first surface faces the shell, and includes a coated region coated with a first active material and an uncoated region; the uncoated region includes a first uncoated region disposed at an end of the jelly roll, and the first uncoated region includes alternating bent portions and straight portions; and the bent portions are provided with an insulating layer.

18 Claims, 10 Drawing Sheets

(51) Int. Cl.
*H01M 4/36* (2006.01)
*H01M 4/66* (2006.01)
*H01M 4/70* (2006.01)

(58) Field of Classification Search
CPC .... H01M 10/643; H01M 4/366; H01M 4/667;
H01M 4/70; H01M 2200/00; H01M
50/107; H01M 50/403; H01M 50/105;
H01M 50/46
See application file for complete search history.

(56) References Cited

U.S. PATENT DOCUMENTS

| | | | | |
|---|---|---|---|---|
| 2011/0014509 | A1* | 1/2011 | Kim | H01M 10/0431 |
| | | | | 429/94 |
| 2017/0005318 | A1* | 1/2017 | Otohata | H01M 10/0413 |
| 2018/0248192 | A1* | 8/2018 | Serizawa | C08G 73/1071 |

FOREIGN PATENT DOCUMENTS

| | | | |
|---|---|---|---|
| CN | 203800131 U | | 8/2014 |
| WO | WO2017047778 | * | 3/2017 |

* cited by examiner

FIG. 25

ELECTROCHEMICAL DEVICE

CROSS REFERENCE TO RELATED APPLICATIONS

The present application claims the benefit of priority from China Patent Application No. 201811308831.X, filed on 5 Nov. 2018, the disclosure of which is hereby incorporated by reference in its entirety.

TECHNICAL FIELD

The present application relates to an electrochemical device, and more particularly to an electrochemical device with improved safety performance.

BACKGROUND

At present, electrochemical devices, e.g., batteries, are becoming more widely used as they have become an integral part of people's daily lives. With the rapid development of intelligent electronic products, the requirement for energy density of electrochemical devices is increasingly high. However, the safety of batteries still cannot be guaranteed. The safety issue resulted from the puncturing of batteries caused by the external forces occasionally occurs on the user side, which may even result in battery explosions. In various cases of the external force puncture of batteries, the side face of a cell is particularly susceptible to being punctured. This issue is especially recognized for batteries with high capacity density. Therefore, with the popularization of batteries, users, vendors and battery manufacturers have put forward newer and more stringent requirements for the safety performance of batteries.

In view of this, it is indeed necessary to provide a high energy density electrochemical device with better safety performance, for example, a lithium ion battery.

SUMMARY

The embodiments of the present application seek to solve at least one of the problems in the related art to certain extent by providing an electrochemical device.

The present application provides an electrochemical device including a cell and a shell enclosing the cell. Wherein the cell includes a jelly roll including a first electrode and a second electrode spaced from each other, a separator is disposed between the first electrode and the second electrode. The first electrode and the second electrode are wound to form the cell. The first electrode includes a first current collector including a first surface and a second surface disposed oppositely. Wherein the first surface faces the shell, and includes a coated region coated with a first active material and an uncoated region without the first active material. The uncoated region includes a first uncoated region disposed at an end of the jelly roll, and the first uncoated region includes alternating bent portions and straight portions. The bent portions are provided with an insulating layer.

Additional aspects and advantages of the embodiments of the present application will be described or shown in the following description or interpreted by implementing the embodiments of the present application.

BRIEF DESCRIPTION OF THE DRAWINGS

Drawings necessary to describe the embodiments of the present application or prior art will be briefly illustrated so as to facilitate the description of the embodiments of the present application. Obviously, the drawings described below are only part of the embodiments of the present application. For those skilled in the art, the drawings of other embodiments can still be obtained according to the structures illustrated in the drawings without any creative effort.

FIG. 25(a) is a schematic view of nail penetration from the left side, and FIG. 25(b) is a schematic view of nail penetration from the right side.

DETAILED DESCRIPTION

The embodiments of the present application will be described in detail below. In the specification of the present application, the same or similar components and the components having the same or similar functions are denoted by similar reference signs. The embodiments described herein with respect to the drawings are illustrative and graphical, and are used for providing a basic understanding of the present application. The embodiments of the present application should not be interpreted as limitations to the present application.

As used in the present application, the term "about" is used for describing and explaining minor variations. When being used in combination with an event or circumstance, the term may refer to an embodiment in which the event or circumstance occurs precisely, and an embodiment in which the event or circumstance occurs approximately. For example, when being used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. In addition, amounts, ratios and other values are sometimes presented in range formats in the present application. It should be appreciated that such range formats are for convenience and conciseness, and should be flexibly understood as including not only values explicitly specified to range constraints, but also all individual values or sub-ranges within the ranges, like explicitly specifying each value and each sub-range.

Of the tests for effectively evaluating the safety performance of an electrochemical device (such as a lithium ion battery, exemplified below as a lithium ion battery), the most rigorous test is a nail penetration test: using a pointed steel nail having a certain diameter to pierce the lithium ion battery at a certain speed, so as to cause the lithium ion battery short-circuit. The short-circuit type can be summarized as two types: the first type is an inner short circuit of electrodes of the lithium ion battery, that is, the electrodes of the lithium ion battery contacting each other and being connected to form a short circuit during the nail penetration process; and the second type is a short circuit indirectly generated by the electrodes through the nail, that is, the electrodes of the lithium ion battery being not directly connected, but both in contact with the nail. Since the nail itself is made of steel and capable of conducting electricity, the electrodes are connected.

Specifically, the lithium ion battery may undergo four short-circuit types during the nail penetration process: the first type is a first active material layer electrically contacts with a second active material layer, the second type is that a first active material layer electrically contacts with a second current collector, the third type is that a first current collector electrically contacts with a second current collector, and the forth type is that a first current collector electrically contacts with a second active material layer. The first electrode and the second electrode disclosed in the present application are two types of electrodes of opposite natures. Therefore, the first active material layer and the second active material layer are two active material layers corresponding thereto. The first active material layer can be a cathode active material layer or an anode active material layer; the second active material layer can be an anode active material layer or a cathode active material layer; the first current collector can be a cathode current collector or an anode current collector; and the second current collector can be an anode current collector or a cathode current collector. The above cathode current collector can be an aluminum foil, and the anode current collector can be a copper foil.

In prior art, a layer of bare copper foil and a layer of bare aluminum foil are wound at the end of a cell when the cell is prepared so that a copper-aluminum short circuit is formed when the cell is pierced by an external force such as a steel nail to reduce the heat accumulation in the active material region and divert the heat, thereby avoiding the burning and even an explosion of the cell caused by thermal runaway of the active material. However, for a cell with high power or large capacity, even if a copper-aluminum short circuit is formed when the cell is pierced by an external force, such as a steel nail, a large amount of heat is accumulated in the cell, causing thermal runaway of the active material, thereby causing the burning and even an explosion of the cell.

In order to avoid a large amount of heat accumulation when the cell is pierced by an external force, such as a steel nail, and to maintain a high energy density of the cell, the present application provides an electrochemical device including a cell and a shell enclosing the cell. The cell includes a jelly roll including a first electrode and a second electrode spaced from each other, a separator is disposed between the first electrode and the second electrode. The first electrode and the second electrode are wound to form the cell. The first electrode includes a first current collector including a first surface and a second surface disposed oppositely. The first surface faces the shell and includes a coated region coated with a first active material and an uncoated region without the first active material. The uncoated region includes a first uncoated region disposed at an end of the jelly roll, and the first uncoated region includes alternating bent portions and straight portions. The bent portion is provided with an insulating layer. In some embodiments, the first straight portion is an upper surface of the wound cell structure, and the second straight portion is a lower surface of the wound cell structure. In some embodiments, the first straight portion is a lower surface of the wound cell structure, and the second straight portion is an upper surface of the wound cell structure. In some embodiments, the first bent portion is a left side surface of the wound cell structure, and the second bent portion is a right side surface of the wound cell structure. In some embodiments, the first bent portion is a right side surface of the wound cell structure, and the second bent portion is a left side surface of the wound cell structure.

According to the embodiment of the present application, the bent portions include a first bent portion and a second bent portion; the straight portions include a first straight portion and a second straight portion. And, the first bent portion is provided with an insulating layer.

According to the embodiment of the present application, the second bent portion is provided with an insulating layer.

According to the embodiment of the present application, the bent portions further include a third bent portion corresponding to the first bent portion; and the third bent portion is provided with an insulating layer.

According to the embodiment of the present application, the straight portions are at least partially provided with an insulating layer.

According to the embodiment of the present application, the coating rate of the insulating layer at the straight portions is about 5% to about 100%. In some embodiments, the coating rate of the insulating layer at the straight portions is about 10% to about 100%. In some embodiments, the coating rate of the insulating layer at the straight portions is about 10% to about 75%. Compared with complete coating (i.e., the coating rate is 100%), the partial coating of the insulating layer can reduce the thickness of the finished cell and increase the energy density of the cell of the lithium ion battery, so that the lithium ion battery has better safety performance and improved electrochemical performance.

According to the embodiment of the present application, the insulating layer has a thickness of not less than about 0.5 µm. In some embodiments, the insulating layer has the thickness of about 0.5 µm to about 20 µm. In some embodiments, the insulating layer has the thickness of about 10 µm to about 20 µm. In some embodiments, the insulating layer has the thickness of about 10 µm to about 15 µm.

According to the embodiment of the present application, the second electrode does not include a second current collector without a second active material at the end of the jelly roll.

According to the embodiment of the present application, the insulating layer includes an insulating material, wherein the insulating material includes, but is not limited to, an inorganic oxide and a polymer adhesive or a combination thereof. The inorganic oxide includes, but is not limited to, at least one of aluminum oxide, magnesium oxide, silicon oxide, zirconium oxide, calcium oxide and boehmite; the polymer adhesive includes, but is not limited to, at least one of polyvinylidene fluoride, styrene butadiene rubber and polyacrylate.

According to an embodiment of the present application, the first electrode is a cathode, and the second electrode is an anode. According to an embodiment of the present application, the first electrode can also be an anode, and the second electrode can be a cathode. Hereinafter, the cathode is sometimes exemplified as a first electrode, the cathode active material layer is exemplified as a first active material layer and the cathode current collector is exemplified as a first current collector, the anode is exemplified as a second electrode, the anode active material layer is exemplified as a second active material layer and the anode current collector is exemplified as a second current collector.

According to the embodiment of the present application, the electrochemical device includes, but is not limited to, a lithium ion battery.

In the above lithium ion battery, the cathode current collector can be an aluminum foil or a nickel foil, and the anode current collector can be a copper foil or a nickel foil.

Hereinafter, the lithium ion battery is taken as an embodiment and the preparation of the lithium ion battery is described in conjunction with a specific embodiment. Those skilled in the art would understand that the preparation method described in the present application is merely an embodiment, and any other suitable preparation methods fall within the scope of the present application.

EMBODIMENTS

Embodiments of the lithium ion battery according to the present application and comparative examples for performance evaluation are described below.

Comparative Example 1

Figure 1:
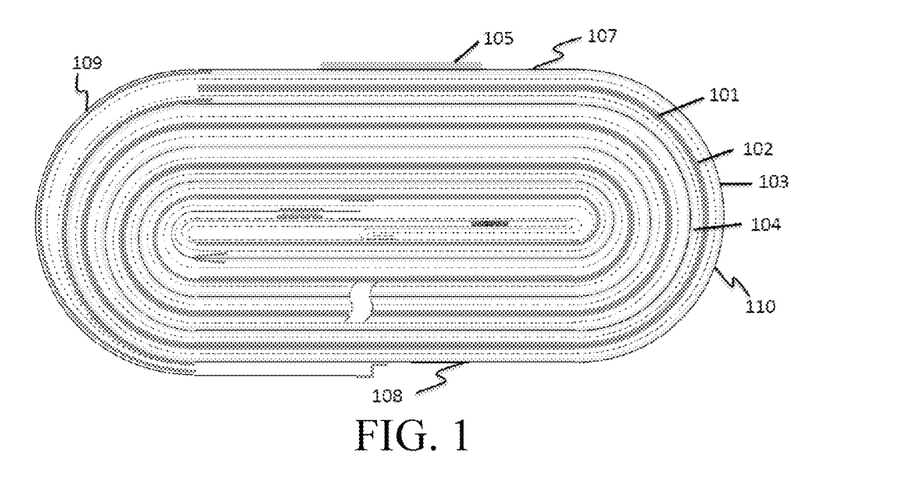
FIG. 1 is a schematic view of a cell structure of Comparative Example 1.
Figure 13:
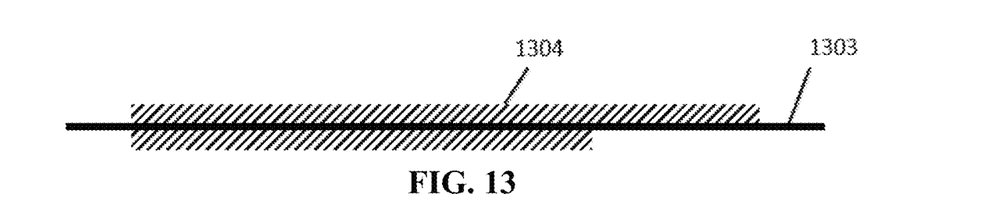
FIG. 13 is a schematic view of a cathode of Comparative Embodiments 1, 2, and 3.
Figure 23:
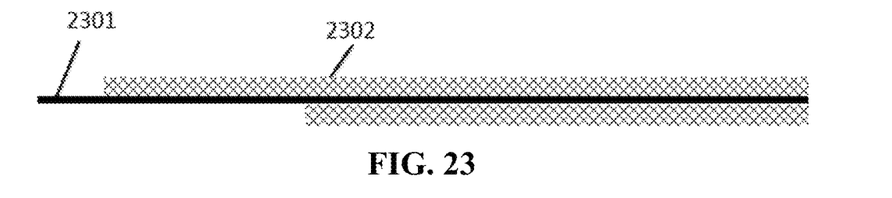
FIG. 23 is a schematic view of an anode in Comparative Examples 1 and 3 and Embodiments 1-11.

As shown in FIG. 13, the bare aluminum foil 1303 is left behind the single-sided coated region of the cathode active material layer 1304. The cathode current collector is not coated with an insulating layer. As shown in FIG. 23, 1 mm of bare copper foil 2301 is left at the aligned end of the anode active material layer 2302. The wound cell structure, as shown in FIG. 1, includes a copper foil 101, graphite 102, an aluminum foil 103, lithium cobalt oxide 104 and a double-sided adhesive tape 105. The outermost ring of the cell structure includes alternating straight portions 107 and 108 and bent portions 109 and 110. The bare aluminum foil approximately covers the straight portions of the outermost empty foil region of the cell, that is, ¼ area of the upper and lower surfaces of the outermost ring.

Comparative Example 2

Figure 2:
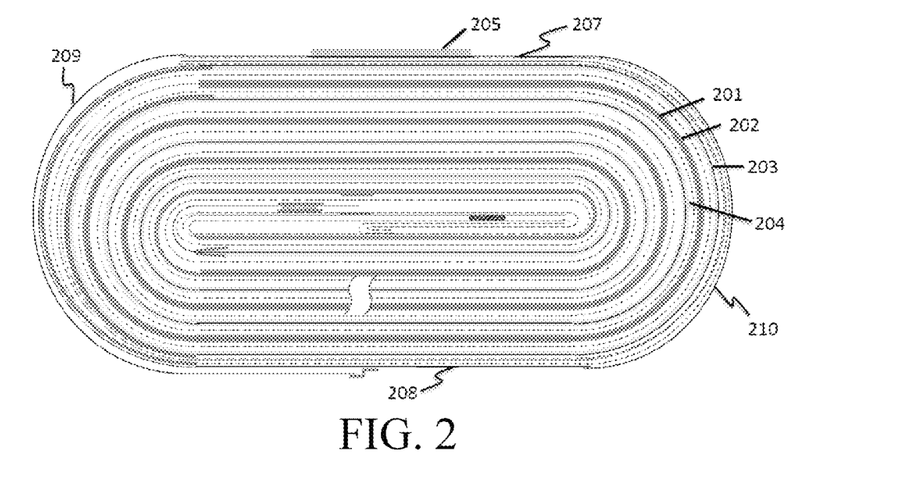
FIG. 2 is a schematic view of a cell structure of Comparative Example 2.
Figure 24:
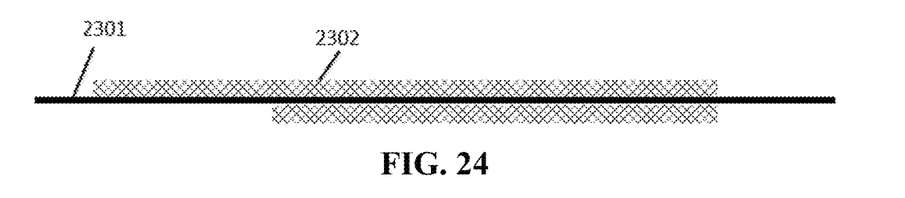
FIG. 24 is a schematic view of an anode in Comparative Example 2.

As shown in FIG. 13, the bare aluminum foil 1303 is left behind the single-sided coated region of the cathode active material layer 1304. The cathode current collector is not coated with an insulating layer. As shown in FIG. 24, the length of the bare copper foil 2401 at the aligned end of the anode active material layer 2402 is about 2.1-2.3 times of the width of the outer ring of the cell. The wound cell structure, as shown in FIG. 2, includes a copper foil 201, graphite 202, an aluminum foil 203, lithium cobalt oxide 204 and a double-sided adhesive tape 205. The outermost ring of the cell structure includes alternating straight portions 207 and 208 and bent portions 209 and 210. The bare aluminum foil approximately covers the straight portions of the outermost empty foil region of the cell, that is, about 2.25 times of the area of the upper and lower surfaces of the outermost ring.

Comparative Example 3

Figure 3:
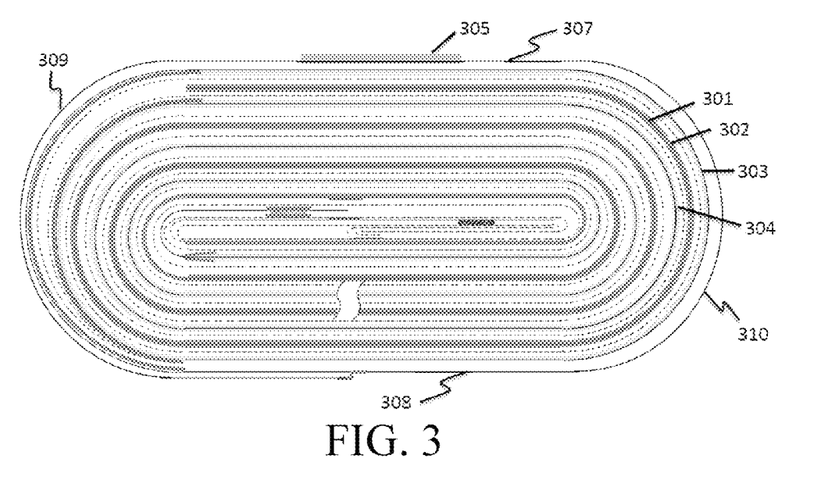
FIG. 3 is a schematic view of a cell structure of Comparative Example 3.

As shown in FIG. 13, the bare aluminum foil 1303 is left behind the single-sided coated region of the cathode active material layer 1304. The cathode current collector is not coated with an insulating layer. As shown in FIG. 23, 1 mm of bare copper foil 2301 is left at the aligned end of the anode active material layer 2302. The wound cell structure, as shown in FIG. 3, includes a copper foil 301, graphite 302, an aluminum foil 303, lithium cobalt oxide 304 and a double-sided adhesive tape 305. The outermost ring of the cell structure includes alternating straight portions 307 and 308 and bent portions 309 and 310. The bare aluminum foil approximately covers the straight portions of the outermost empty foil region of the cell, that is, about 2.25 times of the area of the upper and lower surfaces of the outermost ring.

Embodiment 1

Figure 4:
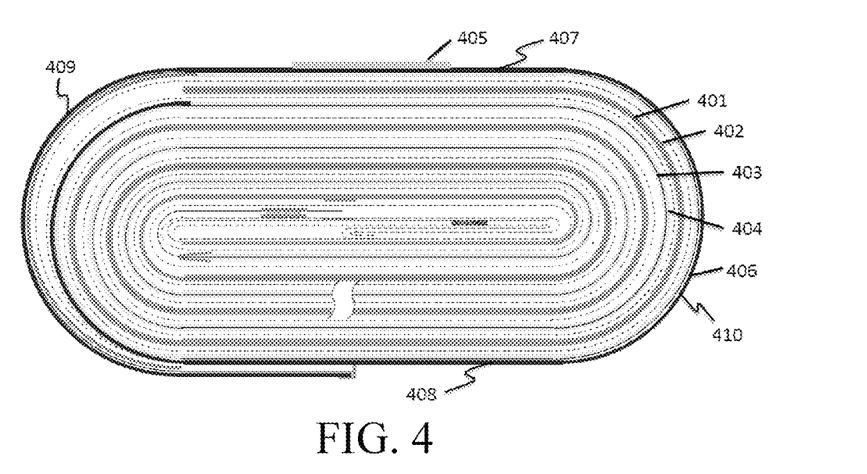
FIG. 4 is a schematic view of a cell structure of Embodiment 1.
Figure 14:
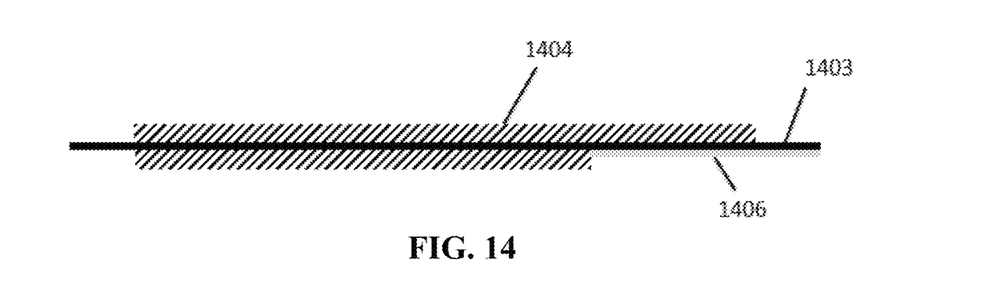
FIG. 14 is a schematic view of a cathode in Embodiments 1, 2, 3, 4, 9, 10, and 11.
Figure 15:
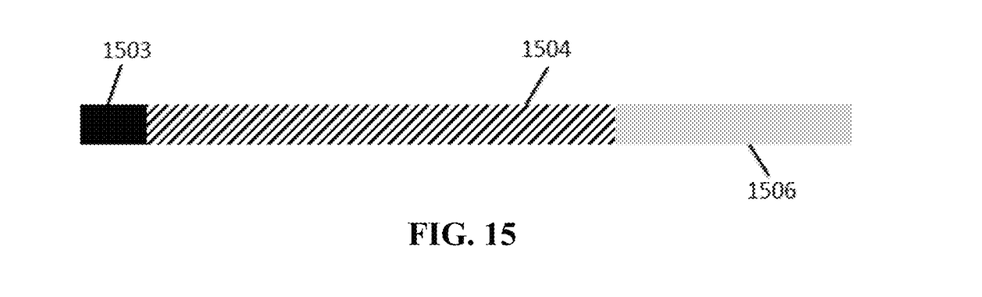
FIG. 15 is a top view of a surface of the cathode in Embodiments 1 and 5, which is coated with an insulating layer.

As shown in FIG. 14, the bare aluminum foil 1403 is left behind the single-sided coated region (coated with the insulating layer 1406) of the cathode active material layer 1404. Boehmite and PVDF are dissolved in NMP at a mass ratio of 98:2, and uniformly stirred to form an insulating material paste. As shown in FIG. 15, on the surface with the shorter cathode active material layer 1504 of the cathode current collector 1503, the insulating material paste is coated on the bare aluminum foil in a winding direction to form an insulating layer 1506 which faces the packaging shell after winding. The left side surface and right side surface of the outermost ring and the left side surface of the secondary outer ring of the cell are coated with the insulating layer; and the coverage rate of the insulating layer on said straight portions, that is, on the upper and lower surfaces of the outermost ring of the cell, is 100%, with the thickness of 20 µm. As shown in FIG. 23, 1 mm of bare copper foil 2301 is left at the aligned end of the anode active material layer 2302. The wound cell structure, as shown in FIG. 4, includes a copper foil 401, graphite 402, an aluminum foil 403, lithium cobalt oxide 404, a double-sided adhesive tape 405 and an insulating layer 406. The outermost ring of the cell structure includes alternating straight portions 407 and 408 and bent portions 409 and 410. The bare aluminum foil approximately covers the straight portions of the outermost empty foil region of the cell, that is, ¼ area of the upper and lower surfaces of the outermost ring.

Embodiment 2

Figure 5:
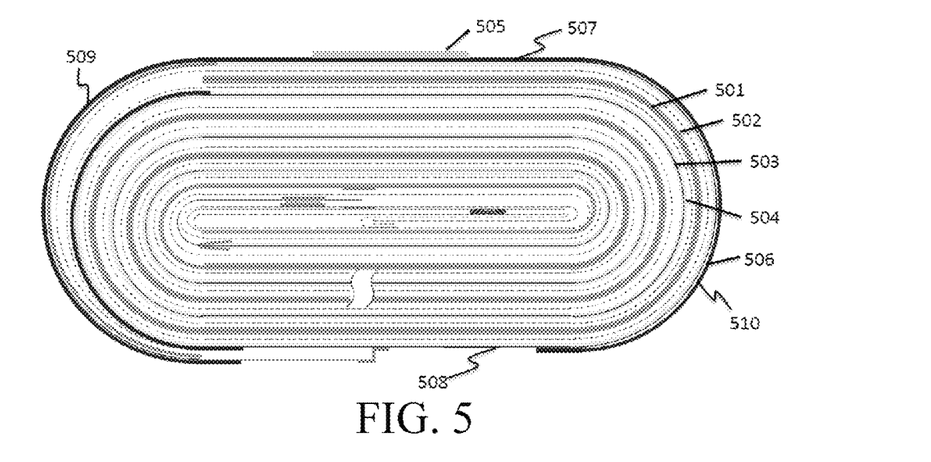
FIG. 5 is a schematic view of a cell structure of Embodiments 2, 9, 10, and 11.
Figure 12:
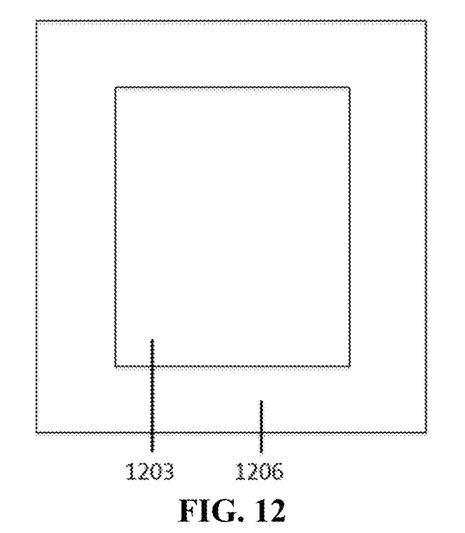
FIG. 12 is a bottom view of a lower surface of the cell structure of Embodiments 2, 3, 6, and 7.
Figure 16:
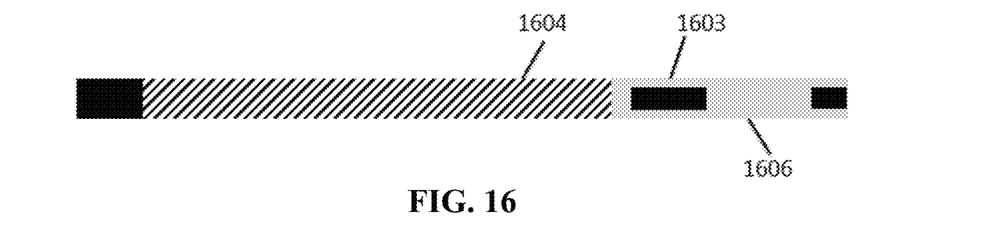
FIG. 16 is a top view of the surface of the cathode in Embodiments 2, 9, 10, and 11, which is coated with an insulating layer.

As shown in FIG. 14, the bare aluminum foil 1403 is left behind the single-sided coated region (coated with the insulating layer 1406) of the cathode active material layer 1404. Boehmite and PVDF are dissolved in NMP at a mass ratio of 98:2, and uniformly stirred to form an insulating material paste. As shown in FIG. 16, on the surface with the shorter cathode active material layer 1604 of the cathode current collector 1603, the insulating material paste is coated on the bare aluminum foil in a winding direction to form an insulating layer 1606 which faces the packaging shell after winding. The middle of the lower surface of the cell is not coated with the insulating layer (as shown in FIG. 12, wherein 1203 is an aluminum foil and 1206 is an insulating layer). The left side surface and right side surface of the outermost ring and the left side surface of the secondary outer ring of the cell are coated with the insulating layer; and the coverage rate of the insulating layer on said straight portions, that is, on the upper and lower surfaces of the outermost ring of the cell, is about 60%, with the thickness of 20 µm. As shown in FIG. 23, 1 mm of bare copper foil 2301 is left at the aligned end of the anode active material layer 2302. The wound cell structure, as shown in FIG. 5, includes a copper foil 501, graphite 502, an aluminum foil 503, lithium cobalt oxide 504, a double-sided adhesive tape 505 and an insulating layer 506. The outermost ring of the cell structure includes alternating straight portions 507 and 508 and bent portions 509 and 510. The bare aluminum foil approximately covers the straight portions of the outermost empty foil region of the cell, that is, ¼ area of the upper and lower surfaces of the outermost ring.

Embodiment 3

Figure 6:
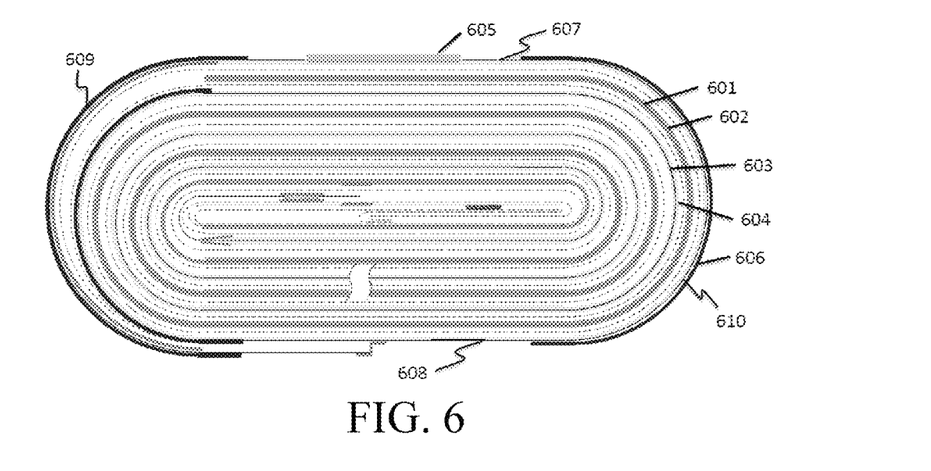
FIG. 6 is a schematic view of a cell structure of Embodiments 3 and 4.
Figure 11:
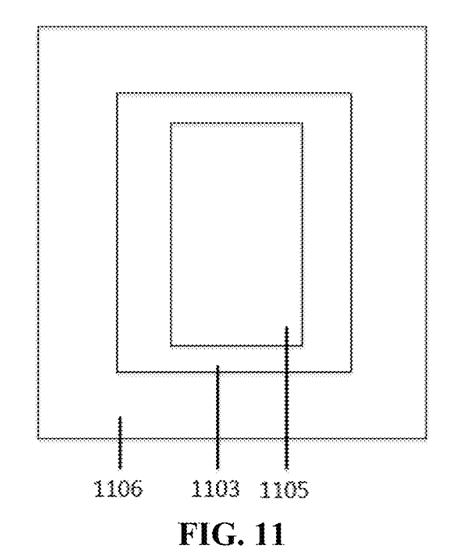
FIG. 11 is a top view of an upper surface of the cell structure of Embodiments 3, 7, 9, 10, and 11.
Figure 17:
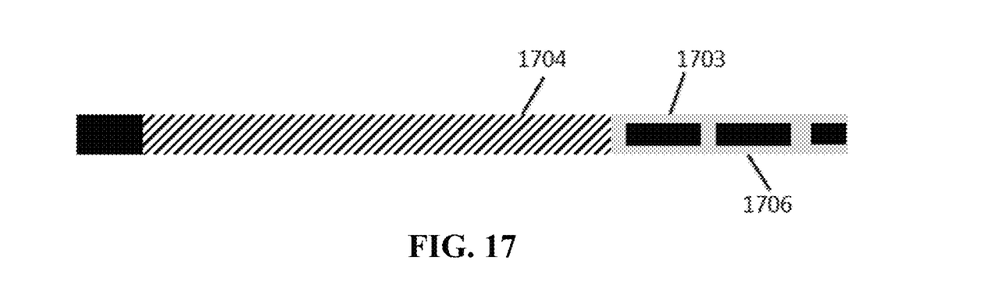
FIG. 17 is a top view of the surface of the cathode in Embodiment 3, which is coated with an insulating layer.

As shown in FIG. 14, the bare aluminum foil 1403 is left behind the single-sided coated region (coated with the insulating layer 1406) of the cathode active material layer 1404. Boehmite and PVDF are dissolved in NMP at a mass ratio of 98:2, and uniformly stirred to form an insulating material paste. As shown in FIG. 17, on the surface with the shorter cathode active material layer 1704 of the cathode current collector 1703, the insulating material paste is coated on the bare aluminum foil in a winding direction to form an insulating layer 1706 which faces the packaging shell after winding. The middles of the upper and lower surfaces of the cell are not coated with the insulating layer (as shown in FIGS. 11 and 12, wherein 1103 and 1203 are aluminum foils, 1106 and 1206 are insulating layers, and 1105 is a double-sided adhesive tape). The left side surface and right side surface of the outermost ring and the left side surface of the secondary outer ring of the cell are coated with the insulating layer; and the coverage rate of the insulating layer on said straight portions, that is, on the upper and lower surfaces of the outermost ring of the cell, is about 20%, with the thickness of 20 µm. As shown in FIG. 23, 1 mm of bare copper foil 2301 is left at the aligned end of the anode active material layer 2302. The wound cell structure, as shown in FIG. 6, includes a copper foil 601, graphite 602, an aluminum foil 603, lithium cobalt oxide 604, a double-sided adhesive tape 605 and an insulating layer 606. The outermost ring of the cell structure includes alternating straight portions 607 and 608 and bent portions 609 and 610. The bare aluminum foil approximately covers the straight portions of the outermost empty foil region of the cell, that is, ¼ area of the upper and lower surfaces of the outermost ring.

Embodiment 4

Figure 18:
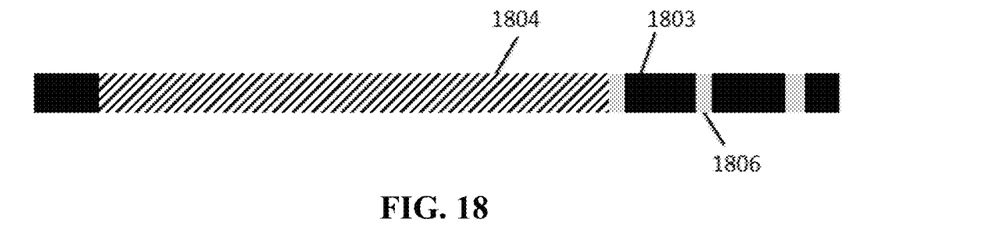
FIG. 18 is a top view of the surface of the cathode in Embodiment 4, which is coated with an insulating layer.

As shown in FIG. 14, the bare aluminum foil 1403 is left behind the single-sided coated region (coated with the insulating layer 1406) of the cathode active material layer 1404. Boehmite and PVDF are dissolved in NMP at a mass ratio of 98:2, and uniformly stirred to form an insulating material paste. As shown in FIG. 18, on the surface with the shorter cathode active material layer 1804 of the cathode current collector 1803, the insulating material paste is coated on the bare aluminum foil in a winding direction to form an insulating layer 1806 which faces the packaging shell after winding. The upper and lower surfaces of the cell are not coated with the insulating layer. The left side surface and right side surface of the outermost ring and the left side surface of the secondary outer ring of the cell are coated with the insulating layer; and the coverage rate of the insulating layer on said straight portions, that is, on the upper and lower surfaces of the outermost ring of the cell, is about 10%, with the thickness of 20 µm. As shown in FIG. 23, 1 mm of bare copper foil 2301 is left at the aligned end of the anode active material layer 2302. The wound cell structure, as shown in FIG. 6, includes a copper foil 601, graphite 602, an aluminum foil 603, lithium cobalt oxide 604, a double-sided adhesive tape 605 and an insulating layer 606. The outermost ring of the cell structure includes alternating straight portions 607 and 608 and bent portions 609 and 610. The bare aluminum foil approximately covers the straight portions of the outermost empty foil region of the cell, that is, ¼ area of the upper and lower surfaces of the outermost ring.

Embodiment 5

Figure 7:
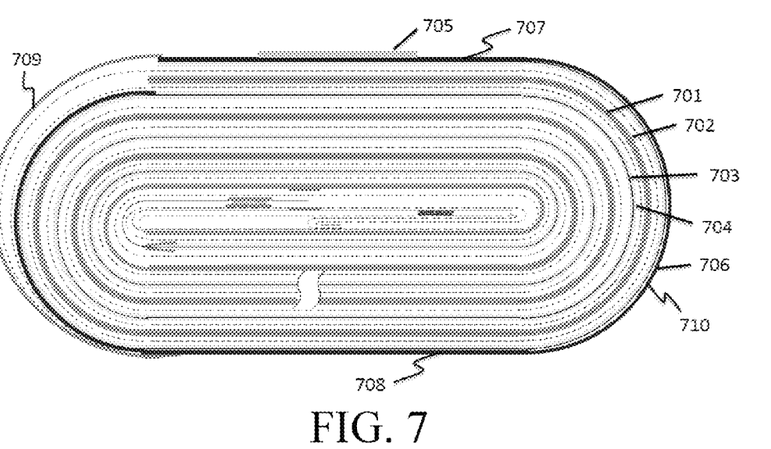
FIG. 7 is a schematic view of a cell structure of Embodiment 5.
Figure 19:
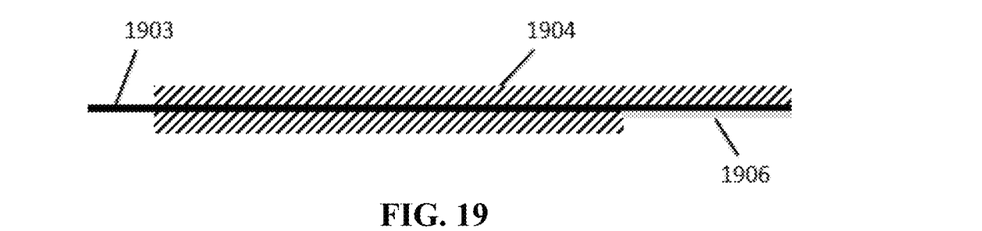
FIG. 19 is a schematic view of the cathode in Embodiments 5, 6, 7, and 8.

As shown in FIG. 19, no bare aluminum foil 1903 is left behind the single-sided coated region (coated with the insulating layer 1906) of the cathode active material layer 1904. Boehmite and PVDF are dissolved in NMP at a mass ratio of 98:2, and uniformly stirred to form an insulating material paste. As shown in FIG. 15, on the surface with the shorter cathode active material layer 1504 of the cathode current collector 1503, the insulating material paste is coated on the bare aluminum foil in a winding direction to form an insulating layer 1506 which faces the packaging shell after winding. The left side surface and right side surface of the outermost ring of the cell are coated with the insulating layer; and the coverage rate of the insulating layer on said straight portions, that is, on the upper and lower surfaces of the outermost ring of the cell, is 100%, with the thickness of 20 µm. As shown in FIG. 23, 1 mm of bare copper foil 2301 is left at the aligned end of the anode active material layer 2302. The wound cell structure, as shown in FIG. 7, includes a copper foil 701, graphite 702, an aluminum foil 703, lithium cobalt oxide 704, a double-sided adhesive tape 705 and an insulating layer 706. The outermost ring of the cell structure includes alternating straight portions 707 and 708 and bent portions 709 and 710.

Embodiment 6

Figure 8:
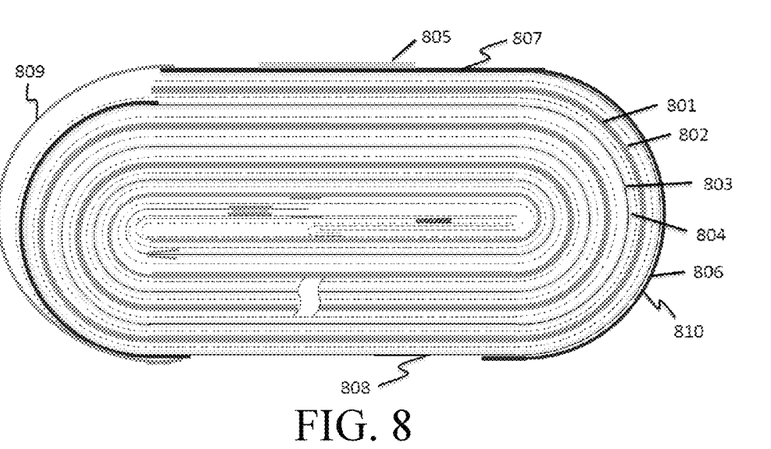
FIG. 8 is a schematic view of a cell structure of Embodiment 6.
Figure 20:
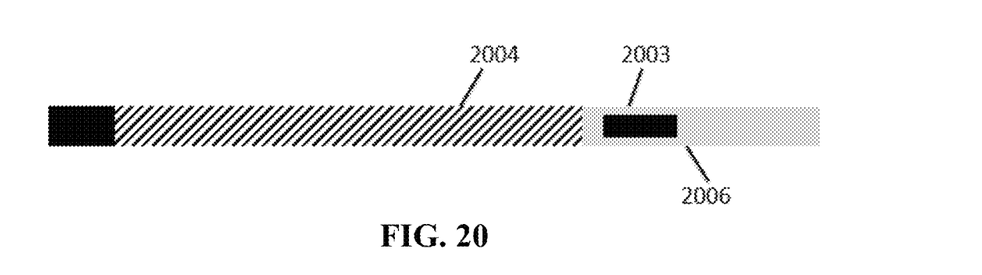
FIG. 20 is a top view of the surface of the cathode in Embodiment 6, which is coated with an insulating layer.

As shown in FIG. 19, no bare aluminum foil 1903 is left behind the single-sided coated region (coated with the insulating layer 1906) of the cathode active material layer 1904. Boehmite and PVDF are dissolved in NMP at a mass ratio of 98:2, and uniformly stirred to form an insulating material paste. As shown in FIG. 20, on the surface with the shorter cathode active material layer 2004 of the cathode current collector 2003, the insulating material paste is coated on the bare aluminum foil in a winding direction to form an insulating layer 2006 which faces the packaging shell after winding. The middle of the lower surface of the cell is not coated with the insulating layer (as shown in FIG. 12, wherein 1203 is an aluminum foil and 1206 is an insulating layer). The left side surface and right side surface of the outermost ring of the cell are coated with the insulating layer; and the coverage rate of the insulating layer on said straight portions, that is, on the upper and lower surfaces of the outermost ring of the cell, is about 55%, with the thickness of 20 μm. As shown in FIG. 23, 1 mm of bare copper foil 2301 is left at the aligned end of the anode active material layer 2302. The wound cell structure, as shown in FIG. 8, includes a copper foil 801, graphite 802, an aluminum foil 803, lithium cobalt oxide 804, a double-sided adhesive tape 805 and an insulating layer 806. The outermost ring of the cell structure includes alternating straight portions 807 and 808 and bent portions 809 and 810.

Embodiment 7

Figure 9:
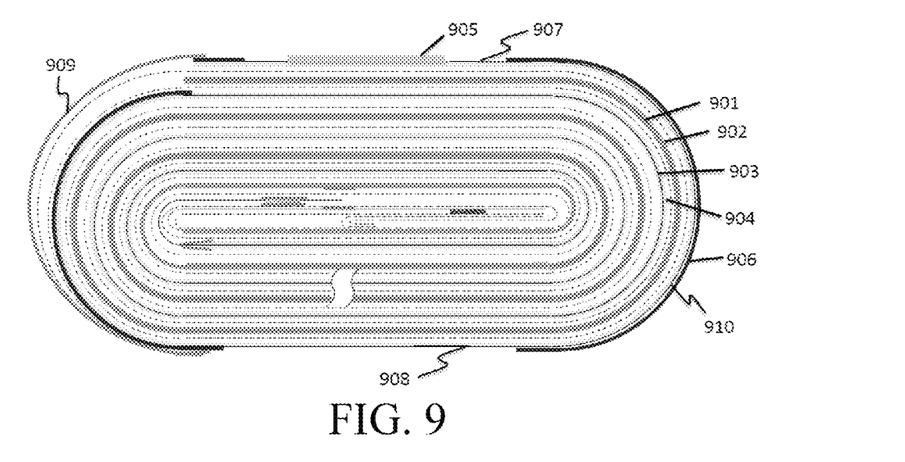
FIG. 9 is a schematic view of a cell structure of Embodiment 7.
Figure 21:
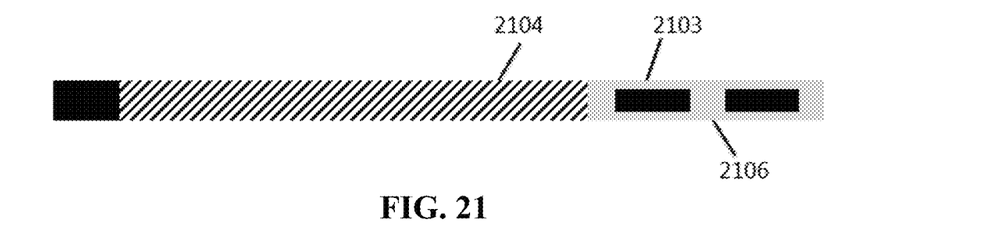
FIG. 21 is a top view of the surface of the cathode in Embodiment 7, which is coated with an insulating layer.

As shown in FIG. 19, no bare aluminum foil 1903 is left behind the single-sided coated region (coated with the insulating layer 1906) of the cathode active material layer 1904. Boehmite and PVDF are dissolved in NMP at a mass ratio of 98:2, and uniformly stirred to form an insulating material paste. As shown in FIG. 21, on the surface with the shorter cathode active material layer 2104 of the cathode current collector 2103, the insulating material paste is coated on the bare aluminum foil in a winding direction to form an insulating layer 2106 which faces the packaging shell after winding. The middles of the upper and lower surfaces of the cell are not coated with the insulating layer (as shown in FIGS. 11 and 12, wherein 1103 and 1203 are aluminum foils, 1106 and 1206 are insulating layers, 1105 is a double-sided adhesive tape). The left side surface and right side surface of the outermost ring of the cell are coated with the insulating layer; and the coverage rate of the insulating layer on said straight portions, that is, on the upper and lower surfaces of the outermost ring of the cell, is about 15%, with the thickness of 20 μm. As shown in FIG. 23, 1 mm of bare copper foil 2301 is left at the aligned end of the anode active material layer 2302. The wound cell structure, as shown in FIG. 9, includes a copper foil 901, graphite 902, an aluminum foil 903, lithium cobalt oxide 904, a double-sided adhesive tape 905 and an insulating layer 906. The outermost ring of the cell structure includes alternating straight portions 907 and 908 and bent portions 909 and 910.

Embodiment 8

Figure 10:
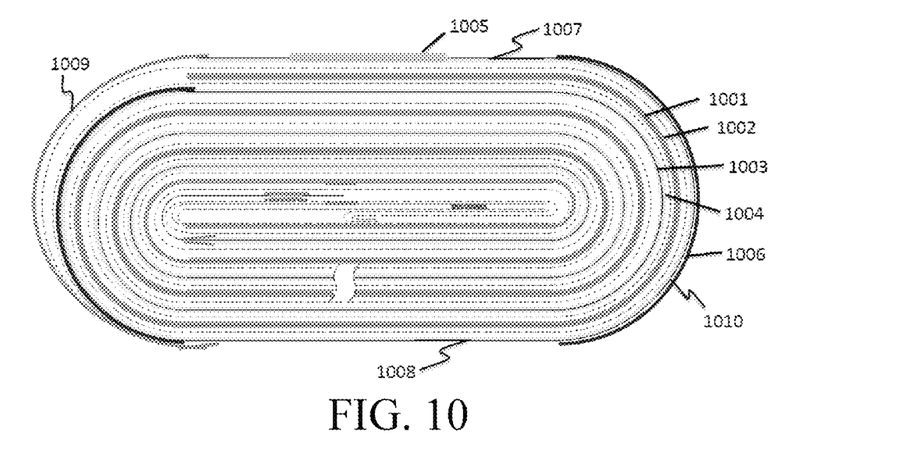
FIG. 10 is a schematic view of a cell structure of Embodiment 8.
Figure 22:
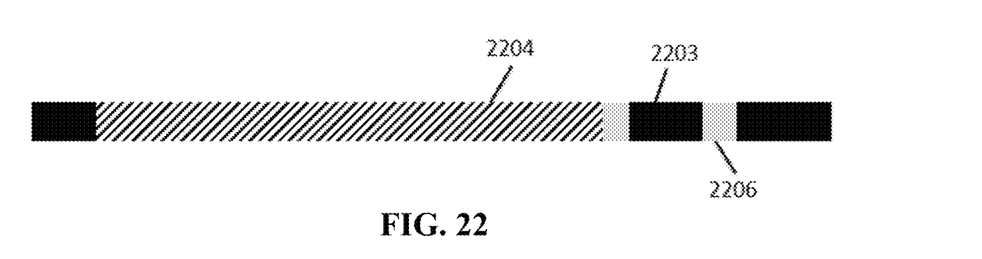
FIG. 22 is a top view of the surface of the cathode in Embodiment 8, which is coated with an insulating layer.

As shown in FIG. 19, no bare aluminum foil 1903 is left behind the single-sided coated region (coated with the insulating layer 1906) of the cathode active material layer 1904. Boehmite and PVDF are dissolved in NMP at a mass ratio of 98:2, and uniformly stirred to form an insulating material paste. As shown in FIG. 22, on the surface with the shorter cathode active material layer 2204 of the cathode current collector 2203, the insulating material paste is coated on the bare aluminum foil in a winding direction to form an insulating layer 2206 which faces the packaging shell after winding. The upper and lower surfaces of the cell are not coated with the insulating layer. The left side surface and right side surface of the outermost ring of the cell are coated with the insulating layer; and the coverage rate of the insulating layer on said straight portions, that is, on the upper and lower surfaces of the outermost ring of the cell, is about 5%, with the thickness of 20 μm. As shown in FIG. 23, 1 mm of bare copper foil 2301 is left at the aligned end of the anode active material layer 2302. The wound cell structure, as shown in FIG. 10, includes a copper foil 1001, graphite 1002, an aluminum foil 1003, lithium cobalt oxide 1004, a double-sided adhesive tape 1005 and an insulating layer 1006. The outermost ring of the cell structure includes alternating straight portions 1007 and 1008 and bent portions 1009 and 1010.

Embodiment 9

As shown in FIG. 14, the bare aluminum foil 1403 is left behind the single-sided coated region (coated with the insulating layer 1406) of the cathode active material layer 1404. Boehmite and PVDF are dissolved in NMP at a mass ratio of 98:2, and uniformly stirred to form an insulating material paste. As shown in FIG. 16, on the surface with the shorter cathode active material layer 1604 of the cathode current collector 1603, the insulating material paste is coated on the bare aluminum foil in a winding direction to form an insulating layer 1606 which faces the packaging shell after winding. The middle of the lower surface of the cell is not coated with the insulating layer (as shown in FIG. 12, wherein 1203 is an aluminum foil and 1206 is an insulating layer). The left side surface and right side surface of the outermost ring and the left side surface of the secondary outer ring of the cell are coated with the insulating layer; and the coverage rate of the insulating layer on said straight portions, that is, on the upper and lower surfaces of the outermost ring of the cell, is about 60%, with the thickness of 10 μm. As shown in FIG. 23, 1 mm of bare copper foil 2301 is left at the aligned end of the anode active material layer 2302. The wound cell structure, as shown in FIG. 5, includes a copper foil 501, graphite 502, an aluminum foil 503, lithium cobalt oxide 504, a double-sided adhesive tape 505 and an insulating layer 506. The outermost ring of the cell structure includes alternating straight portions 507 and 508 and bent portions 509 and 510. The bare aluminum foil approximately covers the straight portions of the outermost empty foil region of the cell, that is, ¼ area of the upper and lower surfaces of the outermost ring.

Embodiment 10

As shown in FIG. 14, the bare aluminum foil 1403 is left behind the single-sided coated region (coated with the insulating layer 1406) of the cathode active material layer 1404. Boehmite and PVDF are dissolved in NMP at a mass ratio of 98:2, and uniformly stirred to form an insulating material paste. As shown in FIG. 16, on the surface with the shorter cathode active material layer 1604 of the cathode current collector 1603, the insulating material paste is coated on the bare aluminum foil in a winding direction to form an insulating layer 1606 which faces the packaging shell after winding. The middle of the lower surface of the cell is not coated with the insulating layer (as shown in FIG. 12, wherein 1203 is an aluminum foil and 1206 is an insulating layer). The left side surface and right side surface of the outermost ring and the left side surface of the secondary outer ring of the cell are coated with the insulating layer; and the coverage rate of the insulating layer on said straight portions, that is, on the upper and lower surfaces of the outermost ring of the cell, is about 60%, with the thickness of 5 μm. As shown in FIG. 23, 1 mm of bare copper foil 2301 is left at the aligned end of the anode active material layer 2302. The wound cell structure, as shown in FIG. 5, includes a copper foil 501, graphite 502, an aluminum foil 503, lithium cobalt oxide 504, a double-sided adhesive tape 505 and an insulating layer 506. The outermost ring of the cell structure includes alternating straight portions 507 and 508 and bent portions 509 and 510. The bare aluminum foil approximately covers the straight portions of the outermost empty foil region of the cell, that is, ¼ area of the upper and lower surfaces of the outermost ring.

Embodiment 11

As shown in FIG. 14, the bare aluminum foil 1403 is left behind the single-sided coated region (coated with the insulating layer 1406) of the cathode active material layer 1404. Boehmite and PVDF are dissolved in NMP at a mass ratio of 98:2, and uniformly stirred to form an insulating material paste. As shown in FIG. 16, on the surface with the shorter cathode active material layer 1604 of the cathode current collector 1603, the insulating material paste is coated on the bare aluminum foil in a winding direction to form an insulating layer 1606 which faces the packaging shell after winding. The middle of the lower surface of the cell is not coated with the insulating layer (as shown in FIG. 12, wherein 1203 is an aluminum foil and 1206 is an insulating layer). The left side surface and right side surface of the outermost ring and the left side surface of the secondary outer ring of the cell are coated with the insulating layer; and the coverage rate of the insulating layer on said straight portions, that is, on the upper and lower surfaces of the outermost ring of the cell, is about 60%, with the thickness of 0.5 μm. As shown in FIG. 23, 1 mm of bare copper foil 2301 is left at the aligned end of the anode active material layer 2302. The wound cell structure, as shown in FIG. 5, includes a copper foil 501, graphite 502, an aluminum foil 503, lithium cobalt oxide 504, a double-sided adhesive tape 505 and an insulating layer 506. The outermost ring of the cell structure includes alternating straight portions 507 and 508 and bent portions 509 and 510. The bare aluminum foil approximately covers the straight portions of the outermost empty foil region of the cell, that is, ¼ area of the upper and lower surfaces of the outermost ring.

The test methods for the performance of the batteries obtained in the above Comparative Examples and Embodiments are as follows:

(1) Nail Penetration Test of Lithium Ion Batteries

Figure 25:
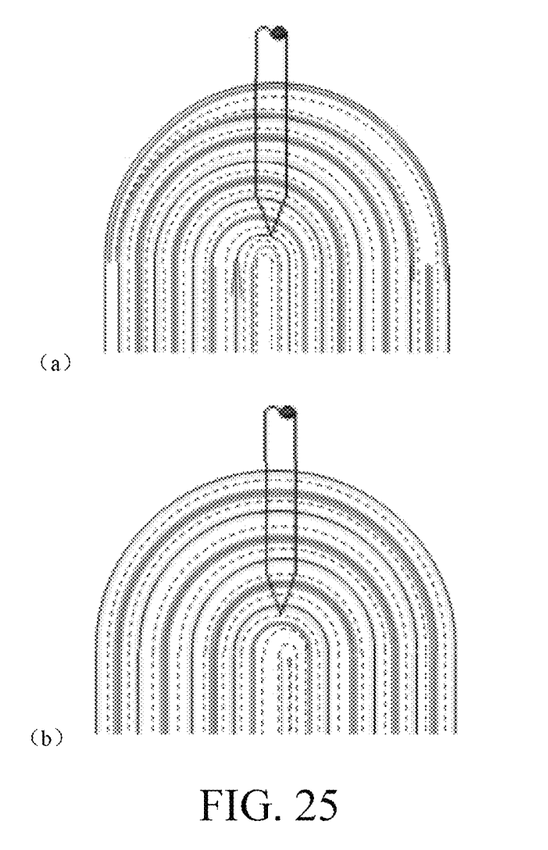
FIG. 25 is a schematic view of a nail penetration test.

Positioning the lithium ion battery in a 25° C. incubator, standing for 30 minutes to ensure that the lithium ion battery reaches a constant temperature. Charging the lithium ion battery reaching the constant temperature at a constant current of 0.7 C until the voltage reaches 4.4V, and then charging to a current of 0.02 C at a constant voltage of 4.4V. Transferring the fully charged lithium ion battery to a nail penetration tester. Keeping the test environment temperature at 25° C. Using a steel nail having the diameter of 4 mm to pass through the center of the lithium ion battery from the left and right sides of the cell at a constant speed of 30 mm/s (as shown in FIG. 25($a$) and FIG. 25($b$)), and retaining for 300 s. Recording the lithium ion battery as passing the test if no smoke, fire or explosion occurred. 32 lithium ion batteries are tested each time, and the number of lithium ion batteries that pass the nail penetration test can be regarded as an indicator to evaluate the safety performance of the lithium ion batteries.

(2) Cell Energy Density Test of Lithium Ion Batteries

Measuring the thickness of the cell with a 700 g soft pack battery thickness gauge, and calculating the cell energy density by the following formula:

Cell energy density=(cell capacity×platform voltage/cell volume)

wherein, the cell capacity is 3.3 Ah, the cell platform voltage is 3.85 V, and the cell volume=(cell length×cell width×cell thickness).

The following table shows variable settings and test results of Comparative Examples and Embodiments.

| | Structural features | Coverage rate of insulating layer at straight portions | Thickness of insulating layer (μm) | Side nail penetration pass rate | | Cell energy density (Wh/L) |
| --- | --- | --- | --- | --- | --- | --- |
| | | | | Left | Right | |
| Comparative Example 1 | Conventional structure | 0 | 0 | 0% | 10% | 650 |
| Comparative Example 2 | Uncoated region of the anode is disposed oppositely | 0 | 0 | 0% | 0% | 640 |
| Comparative Example 3 | Tail aluminum foil extended | 0 | 0 | 0% | 0% | 645 |
| Embodiment 1 | Bare aluminum foil at the tail end Fully coated with the insulating layer | 100% | 20 | 95% | 95% | 638 |
| Embodiment 2 | Bare aluminum foil at the tail end Partially coated with the insulating layer Insulating layer on the lower surface | 60% | 20 | 95% | 95% | 642 |
| Embodiment 3 | Bare aluminum foil at the tail end Partially coated with the insulating layer Insulating layer on the upper and lower surfaces | 20% | 20 | 95% | 95% | 650 |

-continued

|  | Structural features | Coverage rate of insulating layer at straight portions | Thickness of insulating layer (μm) | Side nail penetration pass rate Left | Side nail penetration pass rate Right | Cell energy density (Wh/L) |
| --- | --- | --- | --- | --- | --- | --- |
| Embodiment 4 | Bare aluminum foil at the tail end Partially coated with the insulating layer No insulating layer on the upper and lower surfaces | 10% | 20 | 95% | 95% | 650 |
| Embodiment 5 | No bare aluminum foil at the tail end Fully coated with the insulating layer | 100% | 20 | 95% | 95% | 640 |
| Embodiment 6 | No bare aluminum foil at the tail end Partially coated with the insulating layer Insulating layer on the lower surface | 55% | 20 | 95% | 95% | 644 |
| Embodiment 7 | No bare aluminum foil at the tail end Partially coated with the insulating layer Insulating layer on the upper and lower surfaces | 15% | 20 | 95% | 95% | 652 |
| Embodiment 8 | No bare aluminum foil at the tail end Partially coated with the insulating layer No insulating layer on the upper and lower surfaces | 5% | 20 | 95% | 95% | 652 |
| Embodiment 9 | Bare aluminum foil at the tail end Partially coated with the insulating layer Insulating layer on the lower surface | 60% | 10 | 95% | 95% | 640 |
| Embodiment 10 | Bare aluminum foil at the tail end Partially coated with the insulating layer Insulating layer on the lower surface | 60% | 5 | 95% | 95% | 641 |
| Embodiment 11 | Bare aluminum foil at the tail end Partially coated with the insulating layer Insulating layer on the lower surface | 60% | 0.5 | 95% | 95% | 642 |

It can be seen from the above results that applying an insulating layer to at least partially protect the region, which is not covered by the active material, of the cathode current collector can improve the safety performance of the lithium ion battery. It can be seen from Comparative Example 2 that for the cell having the capacity of 3 Ah, the heat accumulation caused by the copper-aluminum short circuit is sufficient to cause thermal runaway of the active material, resulting in the burning of the cell. That is to say, when the high-capacity cell is pierced by an external force, the conventional method of winding a layer of bare copper foil and a layer of bare aluminum foil at the end of the cell cannot guarantee the safety of the lithium ion battery. It can be seen from Comparative Example 3 that the provision of a long aluminum foil at the tail end of the cathode increases the chance of short-circuiting of the aluminum-anode and cannot guarantee the safety of the lithium ion battery. In Embodiments 1-11, the insulating layer is at least partially coated on the bare aluminum foil in a winding direction on the surface with the shorter cathode active material layer of the cathode current collector, and the insulating layer facing the packaging shell after winding. This configuration significantly reduces the chance of short-circuiting of the aluminum-anode, and significantly improves the nail penetration test pass rate of the lithium ion battery, thereby significantly improving the safety performance of the lithium ion battery. Compared with fully coating the insulating layer on the bare aluminum foil, partially coating the insulating layer can improve the cell energy density of the lithium ion battery.

Throughout the specification, references to "an embodiment", "part of the embodiments", "one embodiment", "another example", "example", "specific example" or "part of the examples" mean that at least one embodiment or example of the present application comprises specific features, structures, materials or characteristics described in the embodiment or example. Thus, the descriptions appear throughout the specification, such as "in some embodiments", "in an embodiment", "in one embodiment", "in another example", "in one example", "in a specific example" or "an example", which does not necessarily refer to the same embodiment or example in the present application. Furthermore, the specific features, structures, materials or characteristics in the descriptions can be combined in any suitable manner in one or more embodiments or examples.

Although the illustrative embodiments have been shown and described, it should be understood by those skilled in the art that the above embodiments cannot be interpreted as limiting the present application, and the embodiments can be changed, substituted and modified without departing from the spirit, principle and scope of the present application.

What is claimed is:

1. An electrochemical device, comprising:
a cell and a shell enclosing the cell;
wherein the cell comprises a jelly roll comprising a first electrode, a second electrode spaced apart from the first electrode, and a separator disposed between the first electrode and the second electrode, and the first electrode and the second electrode are wound to form the jelly roll;
the first electrode comprises a first current collector, the first current collector comprises a first surface and a second surface disposed oppositely; the first surface faces the shell and comprises a coated region coated with a first active material, and an uncoated region without the first active material; the uncoated region comprises a first uncoated region disposed at an end of the jelly roll, and the first uncoated region comprises alternating bent portions and straight portions;
the bent portions comprise a first bent portion and a second bent portion; the first bent portion is a right side of the jelly roll, and the second bent portion is a left side of the jelly roll, the first bent portion and the second bent portion are provided with first insulating layers; and
the straight portions include a first straight portion and a second straight portion, the first straight portion is an upper surface of the jelly roll, and the second straight portion is a lower surface of the jelly roll,
wherein the bent portions further comprise a third bent portion corresponding to the first bent portion in the first uncoated region; and a third insulating layer is in direct contact with the third bent portion and is physically distinct from the separator.

2. The electrochemical device according to claim 1, wherein the straight portions are at least partially provided with the first insulating layers.

3. The electrochemical device according to claim 2, wherein the coating rate of the first insulating layers at the straight portions is about 5% to about 100%.

4. The electrochemical device according to claim 3, wherein the coating rate of the first insulating layers at the straight portions is about 10% to about 100%.

5. The electrochemical device according to claim 4, wherein the coating rate of the first insulating layers at the straight portions is about 10% to about 75%.

6. The electrochemical device according to claim 4, wherein the coating rate of the first insulating layers at the straight portions is about 15%.

7. The electrochemical device according to claim 4, wherein the coating rate of the first insulating layers at the straight portions is about 60%.

8. The electrochemical device according to claim 1, wherein the first insulating layers have a thickness of not less than about 0.5 μm.

9. The electrochemical device according to claim 8, wherein the first insulating layers have a thickness of about 0.5 μm to about 20 μm.

10. The electrochemical device according to claim 8, wherein the first insulating layers have a thickness of about 10 μm to about 20 μm.

11. The electrochemical device according to claim 8, wherein the first insulating layers have a thickness of about 10 μm to about 15 μm.

12. The electrochemical device according to claim 8, wherein the first insulating layers have a thickness of about 20 μm.

13. The electrochemical device according to claim 1, wherein the second electrode does not comprise a second current collector without a second active material at the end of the jelly roll.

14. The electrochemical device according to claim 1, wherein the first insulating layers comprise an insulating material, the insulating material comprises an inorganic oxide, a polymer adhesive, or a combination thereof.

15. The electrochemical device according to claim 14, wherein the inorganic oxide comprises at least one of aluminum oxide, magnesium oxide, silicon oxide, zirconium oxide, calcium oxide, or boehmite.

16. The electrochemical device according to claim 14, wherein the polymer adhesive comprises at least one of polyvinylidene fluoride, styrene butadiene rubber, or polyacrylate.

17. The electrochemical device according to claim 1, wherein the electrochemical device is a lithium ion battery.

18. The electrochemical device according to claim 1, wherein at least one of the first and second straight portions is configured with a double-sided adhesive tape to adhere the cell to the shell.

* * * * *